(12) United States Patent
Wenhua

(10) Patent No.: US 7,000,926 B1
(45) Date of Patent: Feb. 21, 2006

(54) MANUALLY TIGHTENED DRILL CHUCK

(75) Inventor: Zhou Wenhua, Zhejiang (CN)

(73) Assignee: Zhe Jiang San Ou Machinery Co.LTD, Zhejiang (CN)

( * ) Notice: Subject to any disclaimer, the term of this patent is extended or adjusted under 35 U.S.C. 154(b) by 0 days.

(21) Appl. No.: 10/975,479

(22) Filed: Oct. 29, 2004

(51) Int. Cl.
*B23B 31/169* (2006.01)

(52) U.S. Cl. .......................... 279/62; 279/902
(58) Field of Classification Search .......... 279/60, 279/61, 62, 902
See application file for complete search history.

(56) References Cited

U.S. PATENT DOCUMENTS

| | | | | |
|---|---|---|---|---|
| 5,476,273 A | * | 12/1995 | Shadeck et al. | 279/60 |
| 5,501,473 A | * | 3/1996 | Barton et al. | 279/62 |
| 5,716,057 A | * | 2/1998 | Wright et al. | 279/62 |
| 5,741,016 A | * | 4/1998 | Barton et al. | 279/62 |
| 5,816,582 A | * | 10/1998 | Steadings et al. | 279/62 |
| 5,913,524 A | * | 6/1999 | Barton | 279/62 |
| 5,957,469 A | * | 9/1999 | Miles et al. | 279/62 |
| 5,984,320 A | * | 11/1999 | Nakamura | 279/62 |
| 6,073,939 A | * | 6/2000 | Steadings et al. | 279/62 |
| 6,102,411 A | * | 8/2000 | Wilson | 279/62 |
| 6,168,170 B1 | * | 1/2001 | Miles et al. | 279/62 |
| 6,616,147 B1 | * | 9/2003 | Wilson | 279/62 |

* cited by examiner

*Primary Examiner*—Boyer D. Ashley
*Assistant Examiner*—Ali Abdelwahed
(74) *Attorney, Agent, or Firm*—Birch, Stewart, Kolasch & Birch, LLP

(57) ABSTRACT

A manually tightened drill chuck includes a drill body, a nut, a front sleeve and a rear sleeve. The front sleeve is provided on the front end of the drill body with the nut being provided in the middle. A decorative sleeve is mounted on the front end of the drill body with an external peripheral surface of the nut being housed in an inner sleeve by shrink fit. At least one key groove is located in the inner wall of the front sleeve. A key cooperates with the key groove. At least one locating member is provided in the lower end of the key that includes a hole. The front sleeve further defines at least one protrusion that corresponds to the position of the hole for snapping into the hole. Accordingly, the stability of the front sleeve and the rear sleeve without radial vibration is achieved.

12 Claims, 3 Drawing Sheets

MANUALLY TIGHTENED DRILL CHUCK

FIELD OF THE INVENTION

The present invention relates to a drill chuck used in machine equipment. More particularly, to a manually tightened drill chuck which has a stable performance when it is mounted in a drilling machine.

DESCRIPTION OF BACKGROUND ART

In the prior art, a drill chuck generally comprises a chuck body, jaws, a nut, a front sleeve and a rear sleeve. For example, as set forth in Chinese Utility Model Patent No. 2322725 published on Jun. 9, 1999 a drill chuck is disclosed. Three jaws for the chuck are provided in three inclined bores distributed uniformly on the chuck body, respectively. Between the nut and the jaw, a thread connection is adopted. Moreover, a thrust bearing is provided in the rear end of the nut with a retaining ring being provided in the rear end of thrust bearing. The rear sleeve is mounted on the rear end of the drill body. The nut includes a duplex-half structure which is combined into an integral construction with a nut sleeve shrinking fit with the nut. Key connections are adopted for torque transmission between the front sleeve and the rear sleeve. Annular protrusions are defined on the inner surface of the front end of the front sleeve with annular recesses being provided to correspond with said protrusions in the drill body. Axial positioning of the front sleeve is carried out by engagement of the protrusions with the recesses. However, the disadvantages of the drill chuck lie in the key connections being adopted for torque transmission between the front sleeve and the nut sleeve. The, use of a single-side key would make the torque transmission off-balance. Furthermore, since axial positioning of the sleeve is carried out by the engagement between the annular protrusions defined in the inner surface of the front end of the front sleeve and said recesses defined in the drill body, the front sleeve is not easy to assemble, and the rear end has no engaging space so that the front sleeve and its rear end would result in a large vibration when being operated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

SUMMARY AND OBJECTS OF THE INVENTION

An object of the present invention is to overcome the disadvantages of the prior art mentioned above by providing a manually tightened drill chuck, which has no vibration and provides a stable torque transmission between a front sleeve and a nut.

According to a manually tightened drill chuck provided by the present utility model, the drill chuck includes a drill body, a nut, a front sleeve and a rear sleeve. The front sleeve is provided on the front end of the drill body. The nut is provided in the middle of said drill body with a decoration sleeve being mounted on the front end of the drill body. The external peripheral surface of the nut is housed in an inner sleeve by shrink fit with at least one key groove being located in the inner wall of the front sleeve. A key cooperates with the key groove and is defined in the lower end of the inner sleeve with the key being located inside the key groove. At least one locating member is provided in the lower end of the key. The locating member includes a hole, and the front sleeve further defines at least one protrusion corresponding to the position of the hole. Therefore, the protrusion may be snapped in said hole.

Further, in accordance with the above-identified manually tightened drill chuck, a plurality of key grooves are provided in the inner wall of the front sleeve with the key grooves being distributed uniformly along the circumference thereof.

Further, in accordance with the above-identified manually tightened drill chuck, the locating member extends downwardly until it extends from the front end surface of said drill body. The locating member forms a bevel edge in order to cover the front end of said drill body, instead of the decorative sleeve.

Further, in accordance with the above-identified manually tightened drill chuck, a plurality of ridges and grooves are provided on the external circular surfaces of both the front sleeve and the rear sleeve, respectively.

To compare the manually tightened drill chuck according to the present invention with the prior art, the present invention has the following advantage of providing at least one key that is fixed in the key groove, acting as a torque transmission portion between the front sleeve and the nut. Thus, the drill chuck can run steadily when operating. Moreover, in order to fix the front sleeve on the inner sleeve, the protrusion of the front sleeve is snapped in a hole of the inner sleeve to axially position the front sleeve and the nut. Accordingly, the assemblage between the front sleeve and the rear sleeve is easier and stable after the assemblage there between. Thus, radial vibration thereof when the drill chuck is operating is eliminated.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
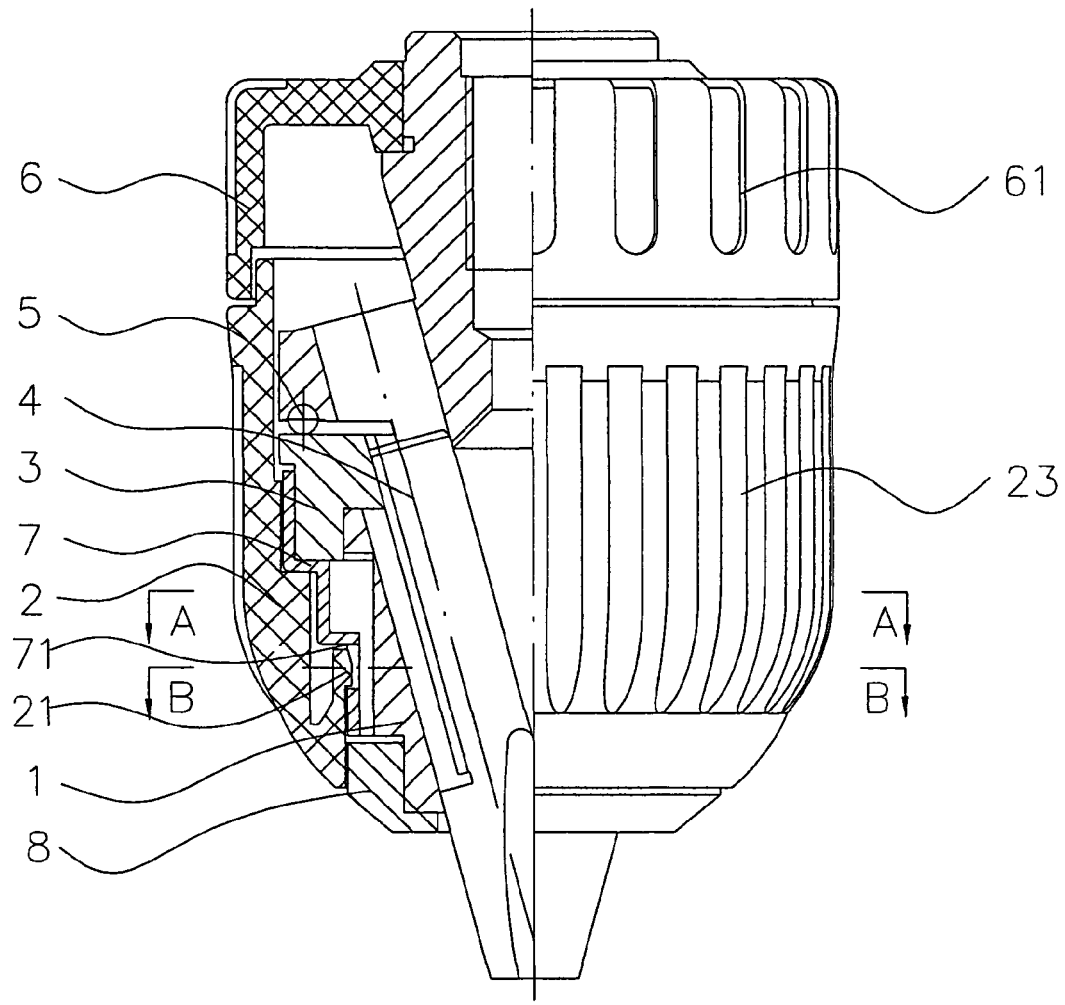
FIG. 1 is a structure view of a preferred embodiment of a manually tightened drill chuck according to the present invention.

Referring to FIG. 1, a preferred embodiment of a manually tightened drill chuck according to the present invention is shown wherein a drill body 1 includes three inclined bores defined peripherally which are equally spaced. In each inclined bore, a jaw 4 is installed slidably. A nut 3 is provided in the middle of the drill body that is interconnected with each jaw 4 by cooperating threads. A front sleeve 2 is defined on the front end of the drill body, and a rear sleeve 6 is placed against the rear end thereof. Moreover, a plurality of bearings 5 are provided on the rear end of the nut 3, by which a relative rotational movement between the nut 3 and the drill body 1 may be achieved.

The nut 3 has a duplex-half structure with an external peripheral surface that is housed in an inner sleeve 7 by shrink fit. The inner sleeve 7 forms a body for rotation. Furthermore, a decorative sleeve 8 is mounted on the front end of the drill body 1.

Figure 3:
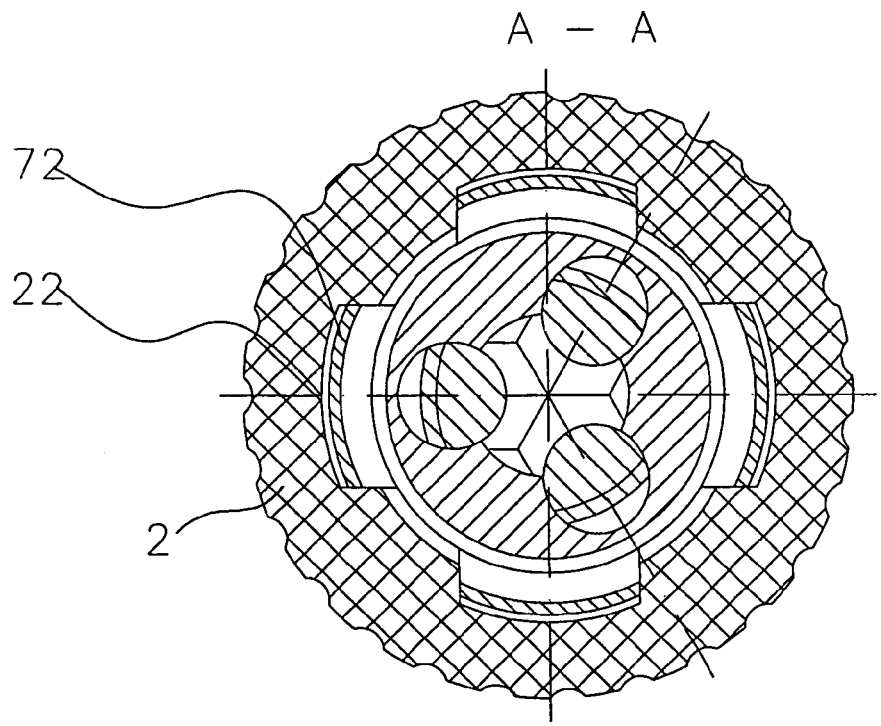
FIG. 3 is a section view taken along line A—A of FIG. 1.

As illustrated in FIG. 3, at least one key groove 22 is located in the inner wall of the front sleeve 2. If there are a plurality of key grooves 22, the key grooves are distributed uniformly along the circumference thereof in order to be stressed uniformly when operating. A key 72 cooperating with the key groove 22 is provided in the lower end of the inner sleeve 7. The key 72 is fixed in the key groove 22 of the front sleeve 2, acting as a torque transmission portion between the front sleeve 2 and nut 3.

Figure 2:
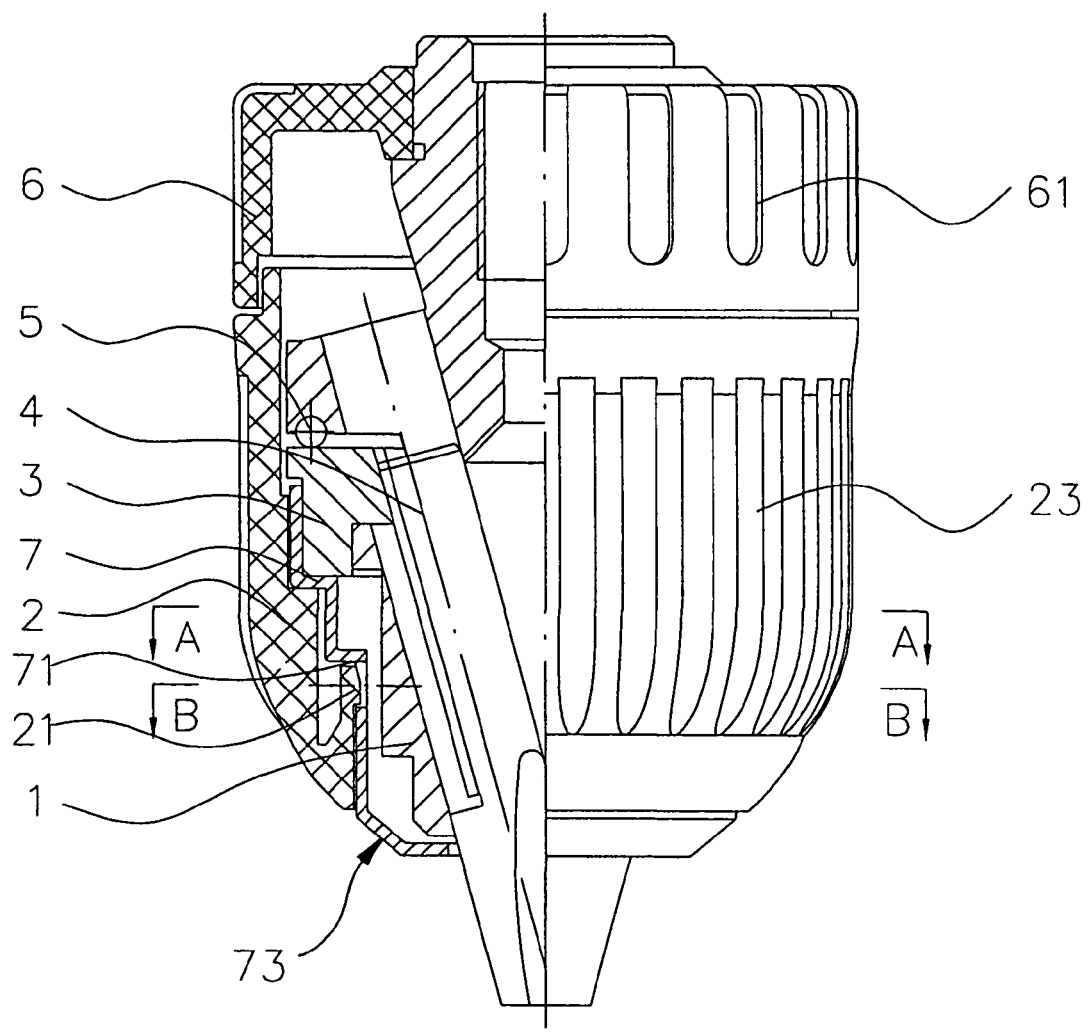
FIG. 2 is a structure view of another preferred embodiment of a manually tightened drill chuck according to the present invention.
Figure 4:
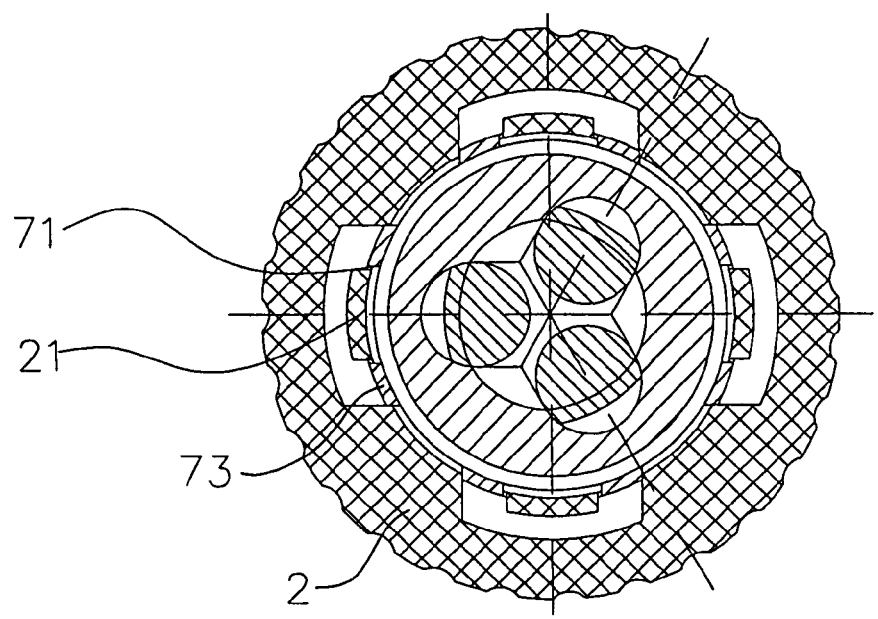
FIG. 4 is a section view taken along line B—B of FIG. 2.

As illustrated in FIG. 2, another preferred embodiment according to the present invention is disclosed wherein the locating member 73 extends downwardly until it extends from the front end surface of the drill body. The locating member 73 is further formed with a bevel edge in order to cover the front end of the drill body 1, instead of the decorative sleeve 8. The improvement lies in that, the number of parts is reduced with a decrease in the product cost. In addition, the chuck is more esthetical. Further, as illustrated in FIG. 4, at least one locating member 73 is shown. The locating member 73 includes a hole 71. Moreover, the front sleeve 2 further defines at least one protrusion 21 corresponding to the position of the hole 71. Therefore, the protrusion 21 of said front sleeve 2 could be snapped in the hole 71 so as to axially position the front sleeve 2 and the nut 3.

In addition, as shown in FIGS. 1 and 2, in the embodiments mentioned above, a plurality of ridges 23 and grooves 61 are provided on the external circular surfaces of both the front sleeve 2 and the rear sleeve 6, respectively, for the convenience of installing and replacing drill bits by the drill chuck operator.

The operation procedure of the manually tightened drill chuck according to the present invention is as follows:

At first, by means of a thread bore of the upper end of said chuck body 1, the drill chuck according to the present invention is fixed to the spindle of a drilling machine, then rotating the front sleeve 2. The front sleeve 2 rotates with the nut 3, so as to cause three jaws 4 to move upwardly simultaneously to increase the opening between the jaws 4. Secondly, a drill bit is inserted into the opening, then the front sleeve 2 is rotated clockwise, so as to cause the nut 3 to rotate, and to cause the three jaws 4 to move downwardly and tighten against the drill bit, after which drilling could be performed. If the drill bit wants to be replaced, the operation procedure is reversed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A manually tightened drill chuck, said drill chuck comprising:
   a drill body;
   a nut;
   a front sleeve and a rear sleeve, said front sleeve being provided on a front end of said drill body, said nut being provided in a middle of said drill body;
   a decorative sleeve being mounted on the front end of said drill body;
   wherein an external peripheral surface of said nut is housed in an inner sleeve by shrink fit with at least one key groove being located in an inner wall of said front sleeve, and a key cooperating with said key groove being defined in a lower end of an inner sleeve, said key being located inside said key groove; and
   at least one locating member being provided in a lower end of said key, said locating member includes a hole, and said front sleeve defines further at least one projection corresponding to the position of the hole wherein the projection may be snapped in said hole.

2. The manually tightened drill chuck according to claim 1, wherein a plurality of key grooves are provided in said inner wall of the front sleeve with the key grooves being distributed uniformly along the circumference thereof.

3. The manually tightened drill chuck according to claim 1, wherein said locating member extends downwardly and extends from the front end of said drill body, and further forms a bevel edge in order to cover the front end of said drill body, instead of the decorative sleeve.

4. The manually tightened drill chuck according to claim 1, wherein a plurality of ridges and grooves are provided on the external circular surfaces of both said front sleeve and said rear sleeve, respectively.

5. A manually tightened drill chuck comprising:
   a drill body;
   a nut;
   a front sleeve positioned on a front end of said drill body with said nut being provided in substantially a middle portion of said drill body, said front sleeve includes at least one projection extending therefrom;
   an external peripheral surface of said nut being housed in an inner sleeve by shrink fit;
   at least one key groove being located in an inner wall of said front sleeve with a key cooperating with said key groove being defined in a lower end of an inner sleeve; and
   at least one locating member being provided in a lower end of said key, said locating member including a hole, and said at least one projection of said front sleeve corresponding to the position of the hole wherein the projection may be snapped in said hole.

6. The manually tightened drill chuck according to claim 5, wherein a plurality of key grooves are provided in said inner wall of the front sleeve with the key grooves being distributed uniformly along the circumference thereof.

7. The manually tightened drill chuck according to claim 5, wherein said locating member extends downwardly and extends from the front end surface of said drill body, and further forms a bevel edge in order to cover the front end of said drill body.

8. The manually tightened drill chuck according to claim 5, wherein a plurality of ridges and grooves are provided on the external circular surfaces of both said front sleeve and a rear sleeve, respectively.

9. A manually tightened drill chuck comprising:
   a body;
   a nut;
   a front sleeve being provided on a front end of said body with said nut being provided in substantially a middle portion of said body;
   an external peripheral surface of said nut being housed in an inner sleeve by shrink fit;
   at least one key groove is located in an inner wall of said front sleeve with a key cooperating with said key groove being defined in a lower end of said inner sleeve, said key being located inside said key groove;

at least one locating member includes a hole with the front sleeve defining at least one projection corresponding to the position of the hole wherein the projection may be snapped in said hole for securing enabling torque transmission.

10. The manually tightened drill chuck according to claim 9, wherein a plurality of key grooves are provided in said inner wall of the front sleeve with the key grooves being distributed uniformly along the circumference thereof.

11. The manually tightened drill chuck according to claim 9, wherein said locating member extends downwardly and extends from the front end of said drill body, and further forms a bevel edge in order to cover the front end of said body.

12. The manually tightened drill chuck according to claim 9, wherein a plurality of ridges and grooves are provided on the external circular surfaces of both said front sleeve and a rear sleeve, respectively.

* * * * *